(12) United States Patent
Akiki et al.

(10) Patent No.: US 12,485,728 B2
(45) Date of Patent: Dec. 2, 2025

(54) THERMAL CONDITIONING SYSTEM FOR A MOTOR VEHICLE

(71) Applicant: Valeo Systemes Thermiques, Le Mesnil-Saint-Denis (FR)

(72) Inventors: Roland Akiki, Le Mesnil-Saint-Denis (FR); Patricia Gardie, Le Mesnil-Saint-Denis (FR); Jinming Liu, Le Mesnil-Saint-Denis (FR); Rody El Chammas, Le Mesnil-Saint-Denis (FR); Regis Beauvis, Le Mesnil-Saint-Denis (FR); Muriel Porto, Le Mesnil-Saint-Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 168 days.

(21) Appl. No.: 18/292,689

(22) PCT Filed: Jul. 21, 2022

(86) PCT No.: PCT/EP2022/070451
§ 371 (c)(1),
(2) Date: Jan. 26, 2024

(87) PCT Pub. No.: WO2023/006561
PCT Pub. Date: Feb. 2, 2023

(65) Prior Publication Data
US 2024/0416725 A1    Dec. 19, 2024

(30) Foreign Application Priority Data
Jul. 26, 2021  (FR) ...................................... 2108071

(51) Int. Cl.
*B60H 1/32*        (2006.01)
(52) U.S. Cl.
CPC .................................. *B60H 1/3205* (2013.01)

(58) Field of Classification Search
CPC .............. B60H 1/3205; B60H 1/32284; B60H 2001/3252; B60H 2001/327; B60H 2001/3285
See application file for complete search history.

(56) References Cited

U.S. PATENT DOCUMENTS

| | | | |
|---|---|---|---|
| 2014/0150476 A1* | 6/2014 | Liu | B60H 1/00914 |
| | | | 62/238.1 |
| 2019/0366800 A1 | 12/2019 | Durrani et al. | |
| 2020/0361280 A1 | 11/2020 | Hashimoto | |

FOREIGN PATENT DOCUMENTS

| | | | |
|---|---|---|---|
| DE | 102018209769 A1 * | 12/2019 | ............. F25B 40/02 |
| FR | 3070316 A1 | 3/2019 | |

(Continued)

OTHER PUBLICATIONS

International Search Report in corresponding International Application No. PCT/EP2022/070451, dated Oct. 31, 2022 (6 pages).
(Continued)

*Primary Examiner* — Emmanuel E Duke
(74) *Attorney, Agent, or Firm* — Osha Bergman Watanabe & Burton LLP

(57) ABSTRACT

A method for controlling a thermal conditioning system is disclosed. The thermal conditioning system includes a refrigerant unit configured to circulate a refrigerant. The refrigerant circuit includes a main loop and a first bypass branch. The main loop includes a compression device, a first heat exchanger configured to exchange heat with a first heat transfer fluid, a first expansion device, and a first evaporator configured to exchange heat with an element of a powertrain of a motor vehicle via a second heat transfer fluid. The method includes determining a pressure of the refrigerant at the outlet of the first evaporator and controlling, depending on the determined pressure, at least one parameter so that the (Continued)

pressure of the refrigerant at the outlet of the first evaporator is below a predetermined pressure threshold.

13 Claims, 5 Drawing Sheets

(56) References Cited

FOREIGN PATENT DOCUMENTS

FR 3073175 A1 * 5/2019 ........... B60H 1/0073
WO 2020-203151 A1 10/2020

OTHER PUBLICATIONS

Written Opinion in corresponding International Application No. PCT/EP2022/070451, dated Oct. 31, 2022 (13 pages).

* cited by examiner

THERMAL CONDITIONING SYSTEM FOR A MOTOR VEHICLE

TECHNICAL FIELD

The present invention relates to the field of thermal conditioning systems. Such systems can in particular be provided on motor vehicles. Systems of this type allow for example thermal regulation of different parts of the vehicle, such as the passenger compartment or an electrical energy storage battery, in the case of a hybrid or electrically powered vehicle. The heat exchanges are mainly managed by the compression and expansion of a refrigerant circulating in a circuit in which a plurality of heat exchangers are positioned.

PRIOR ART

Thermal conditioning systems commonly use a refrigerant circuit comprising a main refrigerant circulation loop and at least one bypass branch arranged in parallel with a part of the main loop. Various valves make it possible to achieve different combinations of circulation of the refrigerant in the different elements of the circuit. Several heat exchangers and refrigerant expansion devices make it possible to control heat exchanges within the thermal conditioning system. It is thus possible to implement different operating modes as desired, such as for example a passenger compartment heating mode, a passenger compartment cooling mode, a mode of cooling an element of the vehicle powertrain such as an electrical energy storage battery.

One particular operating mode of the thermal conditioning system may for example be a mode referred to as powertrain cooling mode. In this mode, an element of the vehicle powertrain is cooled. This element of the powertrain may notably be an electrical energy storage battery. This operating mode thus allows the battery to be cooled, for example when charging. To this end, an evaporator thermally coupled to the battery ensures cooling. The heat taken from the battery is transferred to the refrigerant circulating in the evaporator. This heat is then dissipated in another heat exchanger, for example exchanging heat with an external air stream external to the vehicle. Another operating mode commonly used is the mode referred to as passenger compartment air conditioning mode. This operating mode makes it possible to cool the air stream supplied to the passenger compartment, in order to ensure passenger comfort in a hot environment. To this end, another heat exchanger, operating as an evaporator, is passed through by the air stream supplied to the passenger compartment, and absorbs heat from this air stream. When the thermal conditioning system operates in powertrain cooling mode, the circulation of refrigerant is interrupted in the evaporator coupled to the air stream for the passenger compartment. For this purpose, a shut-off valve, possibly supplemented by a non-return valve, makes it possible to isolate this circuit portion from the active portion of the refrigerant circuit. When the temperature in the passenger compartment is sufficiently cool, the refrigerant present in the passenger compartment exchanger may condense. Since sealing of the shut-off means is generally not perfect, liquid refrigerant may gradually accumulate in the heat exchanger likely to be passed through by the internal air stream internal to the passenger compartment.

Such an accumulation of liquid refrigerant may disrupt the operation of the thermal conditioning system, because the quantity of refrigerant then available to participate in heat exchange may become insufficient. This is detrimental to the energy efficiency of the thermal conditioning system. The invention proposes a method for controlling a thermal conditioning system aimed at preventing excessive accumulation of liquid refrigerant in the heat exchanger not being used, in the event of these operating conditions.

SUMMARY

To this end, the present invention proposes a method for controlling a thermal conditioning system, the thermal conditioning system comprising a refrigerant circuit configured to circulate a refrigerant, the refrigerant circuit comprising:
  a main loop comprising in succession in the direction of circulation of the refrigerant:
  a compression device,
  a first heat exchanger configured to exchange heat with a first heat transfer fluid,
  a first expansion device,
  a first evaporator configured to exchange heat with an element of a powertrain of a motor vehicle via a second heat transfer fluid,
  a first bypass branch connecting a first connection point positioned on the main loop downstream of the first heat exchanger and upstream of the first expansion device to a second connection point positioned on the main loop downstream of the first evaporator and upstream of the compression device, the first bypass branch comprising a second expansion device and a second heat exchanger configured to exchange heat with an internal air stream internal to a passenger compartment of the motor vehicle,
the thermal conditioning system being configured to operate in an operating mode referred to as powertrain cooling mode in which the first heat transfer fluid receives heat from the refrigerant and the second heat transfer fluid transfers heat to the refrigerant, and in which a flow of refrigerant through the second heat exchanger is zero, the method comprising the steps of:
  i) determining a pressure of the refrigerant at the outlet of the first evaporator,
  ii) controlling, depending on the determined pressure, at least one parameter among the following parameters: passage section of the first expansion device, passage section of the second expansion device, flow of refrigerant supplied by the compression device, temperature of the internal air stream, so that the pressure of the refrigerant at the outlet of the first evaporator is below a predetermined pressure threshold.

By adjusting the value of at least one operating parameter of the thermal conditioning system, this system can operate with a pressure of the refrigerant at the outlet of the first evaporator which is below a predetermined pressure threshold. By choosing a sufficiently low value for this threshold, migration of the refrigerant toward the second heat exchanger is prevented. This is because there is, in this case, no difference in pressure likely to induce the gaseous refrigerant to move from the outlet of the first evaporator toward the second heat exchanger. Furthermore, as the pressure at the outlet of the first evaporator is almost equal to the pressure at the outlet of the second heat exchanger, controlling the value of the pressure at the outlet of the first evaporator to a level below the saturated vapor pressure of the refrigerant corresponding to the temperature of the external air stream makes it possible to prevent condensation of the refrigerant in the second exchanger. Undesirable accumulation of liquid refrigerant in the second heat exchanger is prevented. Several operating parameters may be modified to adjust the refrigerant pressure value to a desired value. These parameters may be modified independently or complementarily.

The features listed in the paragraphs below may be implemented independently of one another or in any technically possible combination:

According to one embodiment, the element of the electric powertrain is an electrical energy storage battery. The battery may notably supply electrical energy to an electric drive motor of the vehicle.

As a variant, the element of the electric powertrain may also be an electronic module for controlling an electric drive motor of the vehicle.

According to one embodiment, the first heat transfer fluid is a heat transfer liquid configured to circulate in a third heat exchanger, the third heat exchanger being configured to exchange heat with the internal air stream internal to the passenger compartment of the motor vehicle.

According to another embodiment, the first heat transfer fluid is an internal air stream internal to the passenger compartment of the motor vehicle.

According to one aspect of the invention, the method comprises the steps of:
   a) determining a temperature of the internal air stream,
   b) determining a saturated vapor pressure of the refrigerant corresponding to the temperature of the internal air stream,
   c) assigning the saturated vapor pressure value determined to the predetermined pressure threshold.

This value of the pressure threshold makes it possible to prevent a shift in the load of refrigerant toward the second heat exchanger. The thermal conditioning system can operate stably, without a gradual alteration of its thermal performance.

According to one embodiment, the method comprises the steps of:
   d1) reducing the passage section of the first expansion device to a minimum value,
   e1) increasing the passage section of the second expansion device so that a flow of refrigerant passes through the second heat exchanger.

By causing a flow of refrigerant to pass through the second heat exchanger, operating conditions allowing evaporation of any refrigerant liquid accumulated in the second heat exchanger are obtained.

According to one exemplary embodiment of the method, the minimum value of the passage section of the first expansion device is zero.

According to another exemplary embodiment of the method, the minimum value of the passage section of the first expansion device is between 20% and 50% of a maximum passage section of the first expansion device.

According to another aspect of the method, in which the compression device is of rotary type, the method comprises the step of:
   d2) increasing a speed of rotation of the compression device to a value above a predetermined speed threshold.

Increasing the speed of rotation of the compression device, making it possible to increase the flow of high pressure refrigerant discharged, is another way of adjusting the pressure of the refrigerant in the first evaporator to a desired value.

The compression device has a maximum speed of rotation, and the predetermined speed threshold is greater than 80% of the maximum speed of rotation.

According to one exemplary embodiment, the method comprises the steps of:
   d3) reducing the passage section of the first expansion device,
   e3) maintaining the passage section of the second expansion device at a zero value.

According to another variant embodiment of the method, in which the thermal conditioning system comprises a fourth heat exchanger configured to exchange heat with an external air stream, the thermal conditioning system is configured to circulate the first heat transfer fluid in the fourth heat exchanger.

The fourth heat exchanger makes it possible to cool the heat transfer fluid circulating in the first heat exchanger, by dissipating heat into the external air stream.

According to one embodiment of the method, step ii) is repeated continuously when the thermal conditioning system is in operation.

This aspect of the control method is applied particularly when the refrigerant circuit does not include any mechanical device restricting the circulation of refrigerant from the second connection point toward the outlet of the second heat exchanger.

According to another embodiment of the method, the refrigerant circuit comprises a non-return valve arranged on the first bypass branch downstream of the second heat exchanger and upstream of the second connection point, the non-return valve being configured to block circulation of the refrigerant from the second connection point toward an outlet of the second heat exchanger.

As a variant, the refrigerant circuit comprises a shut-off valve arranged on the first bypass branch downstream of the second heat exchanger and upstream of the second connection point.

A non-return valve, or a shut-off valve, makes it possible to block, or at least limit, routing of refrigerant from the outlet of the first evaporator toward the outlet of the second heat exchanger.

The control method may comprise, before step ii), a step of:
   i1) detecting an accumulation of refrigerant in the second heat exchanger, and step ii) is implemented only if an accumulation of refrigerant in the second heat exchanger is detected in step i1).

In this embodiment, the non-return valve, or the shut-off valve if used instead of the non-return valve, makes it possible to limit the circulation of the refrigerant toward the second heat exchanger. This slows down the accumulation of liquid refrigerant. It is thus possible to apply the step of controlling the pressure of the refrigerant at the outlet of the first evaporator only when it is necessary. Temporary operation under conditions leading to condensation of the refrigerant in the second exchanger is acceptable, because the accumulation of refrigerant is then slow.

According to one aspect of the invention, step ii) is followed by a step of operation in a mode referred to as powertrain cooling mode in which the first heat transfer fluid receives heat from the refrigerant and the second heat transfer fluid transfers heat to the refrigerant, and in which a flow of refrigerant through the second heat exchanger is zero.

Operation in powertrain cooling mode is reactivated when the accumulated refrigerant liquid has been vaporized by controlling the pressure in the first evaporator. Cooling of the element of the powertrain of the vehicle is thus maximized.

According to one exemplary embodiment of the method, step i1) of detecting an accumulation of refrigerant in the second heat exchanger comprises the sub-steps of:

determining a temperature of the second heat transfer fluid at the outlet of the first evaporator, if the temperature determined is above a first predetermined threshold, detecting an accumulation of refrigerant in the second heat exchanger.

As a variant or additionally, step i1) of detecting an accumulation of refrigerant in the second heat exchanger comprises the sub-steps of:

determining a speed of variation of the temperature of the second heat transfer fluid at the outlet of the first evaporator, if the speed of variation determined is above a second predetermined threshold, detecting an accumulation of refrigerant in the second heat exchanger.

Too rapid an increase in the temperature of the second heat transfer fluid is an indicator of a lack of refrigerant circulating in the circuit and participating in heat exchange, in other words indicates an excessive accumulation of liquid refrigerant. Monitoring the temperature of the first heat transfer fluid therefore makes it possible to detect the accumulation of refrigerant in the second heat exchanger.

According to one exemplary embodiment, the predetermined threshold depends on an electrical power of the element of the transmission chain.

According to one embodiment, in which the thermal conditioning system comprises a refrigerant accumulation device arranged on the main loop downstream of the first exchanger and upstream of the first connection point, the step of detecting an accumulation of refrigerant in the second heat exchanger comprises the sub-steps of:

determining a value of superheating of the refrigerant at the outlet of the first evaporator, if the superheating determined is above a third predetermined threshold, detecting an accumulation of refrigerant in the second heat exchanger.

When the architecture of the conditioning device allows superheating of the refrigerant at the inlet of the compression device, monitoring of the superheating value makes it possible to diagnose a lack of refrigerant circulating in the refrigerant circuit. Excessive superheating therefore indicates a lack of refrigerant circulating in the circuit.

According to another embodiment, in which the thermal conditioning system comprises a refrigerant accumulation device arranged on the main loop downstream of the second connection point and upstream of the compression device, the step of detecting an accumulation of refrigerant in the second heat exchanger comprises the sub-steps of:

determining a value of supercooling of the refrigerant at the inlet of the first expansion device, if the supercooling determined is below a fourth predetermined threshold, detecting an accumulation of refrigerant in the second heat exchanger.

When the architecture of the conditioning device allows supercooling of the refrigerant at the outlet of the first heat exchanger, in other words at the inlet of the first expansion device, too low a supercooling value indicates a lack of refrigerant in the circuit.

According to one embodiment of the method, step ii) of controlling the pressure of the refrigerant at the outlet of the first evaporator is applied for a predetermined duration.

According to one exemplary embodiment, the predetermined duration depends on the temperature of the internal air stream.

According to another exemplary embodiment, the method comprises the steps of:
a) determining a temperature of the internal air stream,
b) determining a saturated vapor pressure of the refrigerant for the determined value of the temperature of the internal air stream,
c) determining the difference between the saturated vapor pressure of the refrigerant for the determined value of the temperature of the internal air stream and the predetermined threshold, and the predetermined duration depends on the difference determined in step c).

According to one embodiment, the thermal conditioning system comprises a second bypass branch connecting a third connection point positioned on the main loop downstream of the first connection point and upstream of the first expansion device to a fourth connection point positioned on the main loop downstream of the first evaporator and upstream of the second connection point, the second bypass branch comprising a third expansion device and a third heat exchanger configured to exchange heat with an external air stream external to the passenger compartment of the motor vehicle.

The third heat exchanger ensures operation of the thermal conditioning system in heat pump mode. In other words, in this mode the heat allowing the vaporization of the refrigerant in the third heat exchanger is taken from the external air stream, and is transferred to the internal air stream internal to the passenger compartment.

According to one exemplary embodiment, the thermal conditioning system comprises an internal heat exchanger arranged jointly on the main loop downstream of the first heat exchanger and upstream of the first connection point, and on the main loop downstream of the second connection point and upstream of the compression device.

The internal heat exchanger makes it possible to increase the variation in enthalpy of the refrigerant during the thermodynamic cycle and improves the efficiency of the system.

According to one embodiment, the method comprises the steps of:

Heating the internal air stream so that the pressure of the refrigerant at the outlet of the first evaporator is below a predetermined threshold.

According to one exemplary embodiment of the method, the thermal conditioning system comprises an electric heating device, and heating of the internal air stream is carried out by activation of an electric heating device.

The method thus comprises the step of:

Activating the electric heating device for a predetermined duration.

According to one variant embodiment of the method, the method comprises the steps of:

operating the thermal conditioning system in a mode referred to as energy recovery mode, in which the first heat transfer fluid receives heat from the refrigerant and the second heat transfer fluid transfers heat to the refrigerant, so as to heat the internal air stream, controlling the flow of the internal air stream to a value below a predetermined threshold.

These steps make it possible to limit the energy dissipated by the electric heating device, and therefore to improve the energy efficiency of the system.

According to one embodiment, the first heat transfer fluid heats the internal air stream via the third heat exchanger.

According to one embodiment, the thermal conditioning system comprises a movable shutter configured to adjust a rate of recirculation of the internal air stream, and the method comprises the step of:

controlling the position of the movable shutter so that the rate of recirculation of the internal air stream is above a predetermined threshold.

According to one variant embodiment, the predetermined threshold of the rate of recirculation of the internal air stream is constant.

According to another variant embodiment, the method comprises the step of:
detecting the presence of at least one occupant in the passenger compartment of the vehicle,
if the presence of at least one occupant is detected, assigning a first value to the predetermined threshold of the rate of recirculation of the internal air stream,
otherwise, assigning a second value to the predetermined threshold of the rate of recirculation of the internal air stream, the second value being greater than the first value.

The first value of the predetermined threshold of the rate of recirculation of the internal air stream is between 10% and 60%.

The second value of the predetermined threshold of the rate of recirculation of the internal air stream is between 60% and 100%.

BRIEF DESCRIPTION OF THE DRAWINGS

Further features, details and advantages will become apparent on reading the detailed description below, and on studying the appended drawings, in which.

DESCRIPTION OF THE EMBODIMENTS

Figure 1:
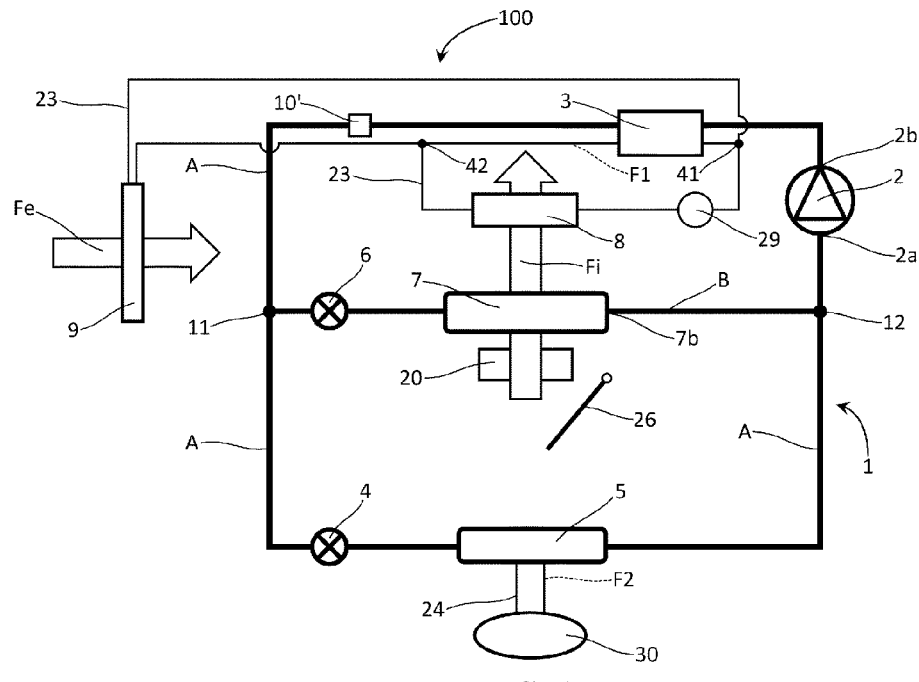
FIG. 1 is a schematic view of a thermal conditioning system according to a first embodiment of the invention.

In order to make it easier to read the figures, the various elements are not necessarily shown to scale. In these figures, identical elements have the same reference signs. Some elements or parameters may be given ordinal numbers, in other words designated for example first element or second element, or first parameter and second parameter, etc. The purpose of this ordinal numbering is to make a distinction between elements or parameters that are similar but not identical. This ordinal numbering does not imply any priority of one element, or parameter, over another and the designations may be interchanged.

In the following description, the expression "a first element upstream of a second element" means that the first element is placed before the second element with respect to the direction of circulation, or travel, of a fluid. Similarly, the expression "a first element downstream of a second element" means that the first element is placed after the second element with respect to the direction of circulation, or travel, of the fluid concerned. In the case of the refrigerant circuit, the expression "a first element is upstream of a second element" means that the refrigerant passes in succession through the first element and then the second element, without passing via the compression device. In other words, the refrigerant leaves the compression device, possibly passes through one or more elements and then passes through the first element, then the second element, then returns to the compression device, in some cases having passed through further elements. The expression "a second element is placed between a first element and a third element" means that the shortest path for traveling from the first element to the third element passes through the second element.

When it is specified that a sub-system comprises a given element, this does not rule out the presence of other elements in this sub-system.

An electronic control unit, not shown in the figures, receives information from various sensors measuring in particular the characteristics of the refrigerant at various points on the circuit. The electronic control unit also receives instructions issued by the occupants of the vehicle, such as the desired temperature inside the passenger compartment for example. The electronic control unit implements control laws for operating the various actuators, in order to control the thermal conditioning system 100 so as to carry out the instructions received.

Each of the expansion devices used may be an electronic expansion valve or a thermostatic expansion valve. In the case of an electronic expansion valve, the passage section through which the refrigerant can pass may be regulated continuously between a closed position and a position of maximum opening. To this end, the control unit of the system controls an electric motor that moves a movable shut-off device controlling the passage section available to the refrigerant. For a given position of the movable shut-off device, "passage section" means the area of a cross section of a circular conduit providing the same flow, for the same pressure differential between the inlet and the outlet of the expansion device.

The compression device 2 may be an electric compressor, that is a compressor the movable parts of which are driven by an electric motor. The compression device 2 comprises a suction side for low pressure refrigerant, also referred to as the inlet 2a of the compression device, and a discharge side for high pressure refrigerant, also referred to as the outlet 2b of the compression device 2. The internal moving parts of the compressor 2 take the refrigerant from low pressure on the inlet 2a side to high pressure on the outlet 2b side. After expansion in one or more expansion devices, the refrigerant leaving the compressor 2 returns to the inlet 2a of the compressor 2 and begins a new thermodynamic cycle.

Each connection point allows the refrigerant fluid to enter one or the other of the circuit portions that meet at this connection point. The refrigerant is distributed between the circuit portions meeting at a connection point by adjusting the opening or closure of the shut-off valve, non-return valve or expansion device included on each of the branches. In other words, each connection point is a means for redirecting the refrigerant arriving at this connection point.

The refrigerant in the refrigerant circuit 1 is in this case a chemical fluid such as R1234yf. Other refrigerants can also be used, such as R134a for example.

FIG. 1 shows a thermal conditioning system 100 comprising a refrigerant circuit 1 configured to circulate a refrigerant, the refrigerant circuit 1 comprising:
- a main loop A comprising in succession in the direction of circulation of the refrigerant:
- a compression device 2,
- a first heat exchanger 3 configured to exchange heat with a first heat transfer fluid F1,
- a first expansion device 4,
- a first evaporator 5 configured to exchange heat with an element 30 of a powertrain of a motor vehicle via a second heat transfer fluid F2,
  - a first bypass branch B connecting a first connection point 11 positioned on the main loop A downstream of the first heat exchanger 3 and upstream of the first expansion device 4 to a second connection point 12 positioned on the main loop A downstream of the first evaporator 5 and upstream of the compression device 2, the first bypass branch B comprising a second expansion device 6 and a second heat exchanger 7 configured to exchange heat with an internal air stream F1 internal to a passenger compartment of the motor vehicle.

Internal air stream Fi means an air stream intended for the passenger compartment of the motor vehicle. This internal air stream Fi may circulate in an HVAC (Heating, Ventilating and/or Air Conditioning) installation. This installation has not been shown in the various figures.

The thermal conditioning system 100 is configured to operate in an operating mode referred to as powertrain cooling mode, in which the first heat transfer fluid F1 receives heat from the refrigerant and the second heat transfer fluid F2 transfers heat to the refrigerant, and in which a flow of refrigerant through the second heat exchanger 7 is zero.

According to the example shown here, the element 30 of the electric powertrain is an electrical energy storage battery. The battery 30 may notably supply electrical energy to an electric drive motor of the vehicle. According to a variant that has not been shown, the element 30 of the electric powertrain may also be an electronic module for controlling an electric drive motor of the vehicle.

Figure 5:
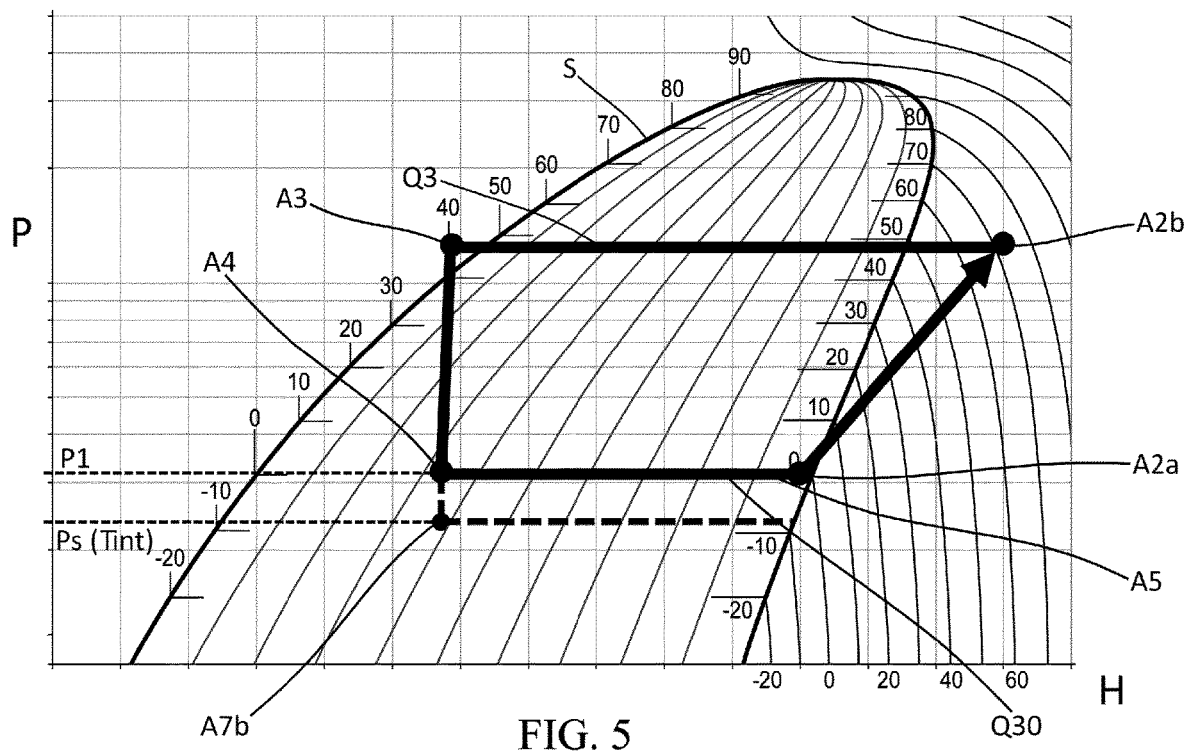
FIG. 5 is a thermodynamic diagram showing the operation of the thermal conditioning system.
Figure 6:
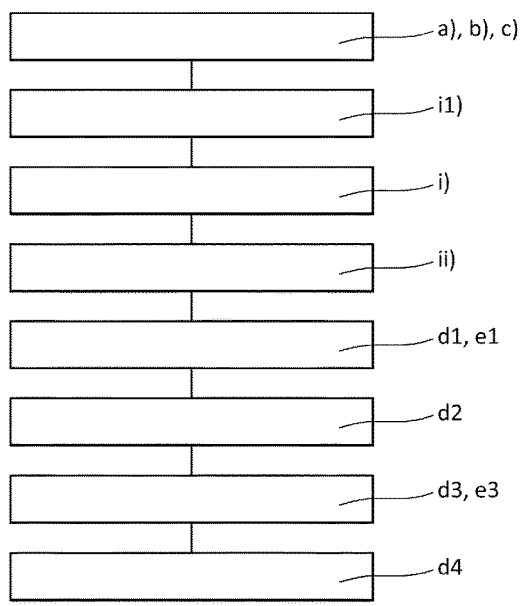
FIG. 6 is a block diagram of the control method according to the invention.
Figure 7:
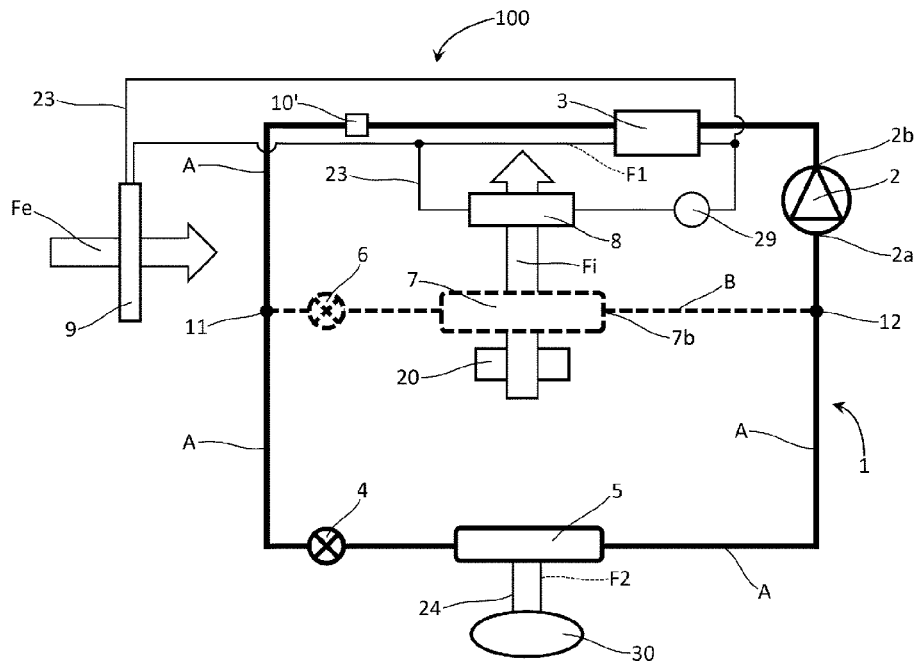
FIG. 7 is a schematic view of the thermal conditioning system of FIG. 1 operating in an operating mode referred to as powertrain cooling mode.

The circulation of the refrigerant in this operating mode is shown in FIG. 7. In FIG. 7, and in FIG. 8, the portions of the refrigerant circuit 1 in which refrigerant circulates are shown in bold lines. The portions in which the refrigerant does not circulate are shown in dashed lines. In the example shown, the battery 30 is cooled during a phase of charging. FIG. 5 is a pressure and enthalpy diagram of the refrigerant during the thermodynamic cycle carried out in the mode referred to as powertrain cooling mode. Point A2a shows the state of the refrigerant at low pressure at the inlet of the compressor 2, while point A2b shows the state of the refrigerant at high pressure at the outlet of the compressor 2. Point A3 shows the state of the refrigerant at high pressure at the outlet of the first exchanger 3. Point A4 shows the state at the outlet of the first expansion device 4. Point A5 shows the state at the outlet of the first evaporator 5. Point A5 and point A2b are, essentially, coincident. The line designated by the sign S corresponds to the saturation curve of the refrigerant. The amount of heat taken from the battery Q30 is shown schematically by the difference in enthalpy between point A4 and point A5. The amount of heat released into the first heat transfer fluid F1 in the first exchanger 3 is shown schematically by Q3, and is equal to the variation in enthalpy between point A2b and point A3. When the battery charging operation is carried out in a cold or cool environment, the temperature of the internal air stream Fi internal to the passenger compartment may be close to the ambient temperature, assumed here to be equal to −10°. The battery temperature is higher because the charging current heats the battery and the optimal temperature range for the battery is approximately 25° C. to 35° C. The temperature regulation carried out by the thermal conditioning system 100 therefore aims to ensure a battery temperature higher than the ambient temperature at that time. In FIG. 5, the battery temperature is 0° C. The diagram makes it possible to read the pressure conditions in the first evaporator 5 and in the second exchanger 7.

Even if the second exchanger 7 is inactive, that is to say the circulation of refrigerant is blocked because the second expansion device 6 is in the closed position, this exchanger 7 contains refrigerant. The pressure of this refrigerant is equal to the saturation pressure corresponding to the temperature prevailing in the vicinity of the second exchanger 7. As the refrigerant at the outlet of the first evaporator 5 is at a pressure P1 higher than the equilibrium pressure or saturation pressure Ps(Tint) prevailing in the second exchanger 7, the refrigerant leaving the first evaporator 5 and returning to the compressor 2 may migrate, at the second connection point 12, toward the second exchanger 7, and condense therein. In other words, the refrigerant circulating in the main loop A and passing through the first evaporator 5 gradually accumulates in the second heat exchanger 7. Point A7b shows the liquid fraction of refrigerant in the second exchanger 7. The liquid fraction may vary with respect to this illustrative diagram. This gradual accumulation means that the quantity of refrigerant participating in heat exchange may become insufficient, and this is detrimental to the performance of the thermal conditioning system 100. This undesirable accumulation must be avoided.

To this end, the method for controlling the thermal conditioning system 100 comprises the steps of:
i) determining a pressure P1 of the refrigerant at the outlet of the first evaporator 5,
ii) controlling, depending on the determined pressure P1, at least one parameter among the following parameters: passage section S4 of the first expansion device 4, passage section S6 of the second expansion device 6, flow Q of refrigerant supplied by the compression device 2, temperature Ti of the internal air stream Fi, so that the pressure P1 of the refrigerant at the outlet of the first evaporator 5 is below a predetermined pressure threshold Pmax.

Controlling a parameter means the action of modifying this parameter on demand so as to obtain a desired effect in response. The passage sections of the first and second expansion device are controlled by an electrical command making it possible to modify the position of a movable shut-off device. The flow of refrigerant supplied by the compression device is controlled by the speed of rotation of the moving elements of the compression device. The temperature of the second heat transfer fluid is controlled by acting on a device making it possible to adjust the heat exchange between the second heat transfer fluid and a heat source. The electronic control unit may ensure control of the various parameters listed.

By adjusting the value of at least one operating parameter of the thermal conditioning system, this system can operate with a pressure P1 of the refrigerant at the outlet of the first evaporator 5 below a predetermined pressure threshold Pmax. By choosing a sufficiently low value for this threshold Pmax, migration of the refrigerant from the first evaporator 5 toward the second heat exchanger 7 is prevented. This is because in this case there are no thermodynamic conditions favorable to the condensation of the refrigerant in the second heat exchanger 7. Undesirable accumulation of liquid refrigerant in the second heat exchanger 7 is prevented. Several operating parameters may be modified to adjust the refrigerant pressure value to a desired value. These parameters may be modified independently or complementarily.

The control method is a method for controlling the quantity of refrigerant circulating in the refrigerant circuit. In other words, the control method makes it possible to control the distribution between the quantity of refrigerant in the liquid state and the quantity of refrigerant in the gaseous state in the circuit 1.

According to one embodiment, shown in FIG. 1, the first heat transfer fluid F1 is a heat transfer liquid configured to circulate in a third heat exchanger 8, the third heat exchanger 8 being configured to exchange heat with the internal air stream Fi internal to the passenger compartment of the motor vehicle. The third heat exchanger 8 is arranged in the air circulation housing of the heating, ventilating and/or air conditioning device. The third heat exchanger 8 is arranged, according to the direction of flow of the internal air stream Fi, downstream of the second heat exchanger 7. The arrow Fi schematically depicting the flow of the internal air stream passes in succession through the second heat exchanger 7 then the third heat exchanger 8. The first heat transfer fluid F1 circulates in a circuit 23. A circulation pump 29 circulates the first heat transfer fluid in the circuit 23. Likewise, the second heat transfer fluid F2 circulates in a circuit 24. The circuit 24 is thermally coupled to the element 30 of the powertrain of the vehicle.

In this embodiment, the first heat exchanger 3 is a two-fluid heat exchanger arranged jointly on the refrigerant circuit 1 and on the circuit 23 for the first heat transfer fluid F1 so as to allow heat exchange between the refrigerant and the first heat transfer fluid F1. The first heat transfer fluid F1 is for example a glycol water mixture. Heating of the passenger compartment is thus ensured in manner referred to as indirect, since the heat exchange between the refrigerant and the air in the passenger compartment is carried out via an intermediate heat transfer fluid. This intermediate heat transfer fluid circulates in the circuit 23.

Figure 2:
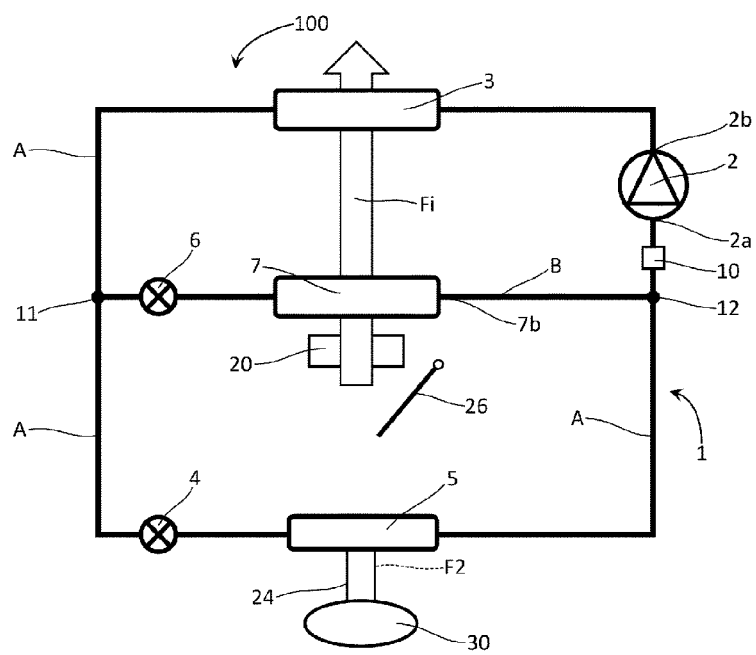
FIG. 2 is a schematic view of a thermal conditioning system according to a second embodiment of the invention.

According to another embodiment, shown in FIG. 2, the first heat transfer fluid F1 is an internal air stream Fi internal to the passenger compartment of the motor vehicle. Heating of the passenger compartment is ensured in manner referred to as direct, by heat exchange between the refrigerant and the air stream Fi intended for the passenger compartment.

The first heat exchanger 3 is, in this embodiment, arranged in the air circulation housing of the heating, ventilating and/or air conditioning device. A motor-fan unit, not shown in the figures, is positioned in the heating, ventilating and/or air conditioning installation in order to increase the flow rate of the internal air stream Fi if necessary. The arrow Fi schematically depicting the flow of the internal air stream passes in succession through the second heat exchanger 7 then the first heat exchanger 3. The internal air stream Fi may be made up of a fraction of recycled air, that is to say air already present in the passenger compartment, and a fraction of fresh air, that is to say air taken from the ambient air located outside the vehicle. Various air intake vents and various movable shutters allow the distribution between the fraction of recycled air and the fraction of fresh air in the passenger compartment to be adjusted.

External air stream Fe means an air stream not intended for the passenger compartment of the vehicle. In other words, this air stream Fe remains outside the passenger compartment of the vehicle. Another motor-fan unit, also not shown, may be activated in order to increase the flow rate of the external air stream Fe if necessary. This motor-fan unit is arranged for example in the front face of the vehicle, that is to say behind the vehicle grille.

The first expansion device 4 has a passage section adjustable between a minimum value Smin4 and a maximum value Smax4. For this purpose, a movable shut-off device, not shown, may be moved between two end positions. The movement of the movable shut-off device may be continuous, that is to say that the movable shut-off device may take up all the intermediate positions between the two end positions. In other words, the flow passing through the expansion device may vary continuously depending on the position of the movable shut-off device. The maximum value of the passage section corresponds to the value obtained when the movable shut-off device is in the position of maximum opening. The minimum value corresponds to the value obtained when the movable shut-off device is in the position of minimum opening. The position of minimum opening may be zero. The expansion device is then said to be in the closed position. The movable shut-off device may then be in contact with a seat, such that the flow of refrigerant passing through the expansion device is then zero. Likewise, the second expansion device 6 has a passage section adjustable between a minimum value Smin6 and a maximum value Smax6. According to variant embodiments not shown, the position of the movable shut-off device of each of the expansion devices may vary discretely in a set of intermediate positions.

According to one aspect of the invention, the method comprises the steps of:
 a) determining a temperature Tint of the internal air stream Fi,
 b) determining a saturated vapor pressure Ps of the refrigerant corresponding to the temperature Tint of the internal air stream Fi,
 c) assigning the saturated vapor pressure Ps value determined to the predetermined pressure threshold Pmax.

This value of the pressure threshold Pmax makes it possible to prevent a shift in the load of refrigerant toward the second heat exchanger 7. The thermal conditioning system can operate stably, without a gradual alteration of its thermal performance.

The thermal conditioning system 100 comprises a sensor for measuring the temperature of the internal air stream Fi, not shown. The sensor may be a thermistor, for example a negative temperature coefficient thermistor. The temperature sensor may also be a thermocouple. The sensor is positioned in the air stream Fi, in the vicinity of the second exchanger 7 and preferably upstream thereof.

Adjusting the distribution between the flow of refrigerant circulating in the first heat exchanger 5 and the flow of refrigerant circulating in the second heat exchanger 7 makes it possible to ensure control of the pressure P1 at the outlet of the first evaporator 5. Thus, according to one embodiment, the method comprises the steps of:
 d1) reducing the passage section S4 of the first expansion device 4 to a minimum value Smin,
 e1) increasing the passage section S6 of the second expansion device 6 so that a flow of refrigerant passes through the second heat exchanger 7.

By causing a flow of refrigerant to pass through the second heat exchanger 7, operating conditions allowing evaporation of any refrigerant liquid accumulated in the second heat exchanger 7 are obtained.

To be specific, the pressure of the flow of refrigerant which passes through the second heat exchanger 7 is then lower than the saturation pressure Ps of the refrigerant for a temperature equal to the temperature Tint of the internal air stream Fi. Thus, the liquid refrigerant accumulated in the second heat exchanger 4 evaporates and joins the quantity of refrigerant circulating in the refrigerant circuit 1.

Figure 8:
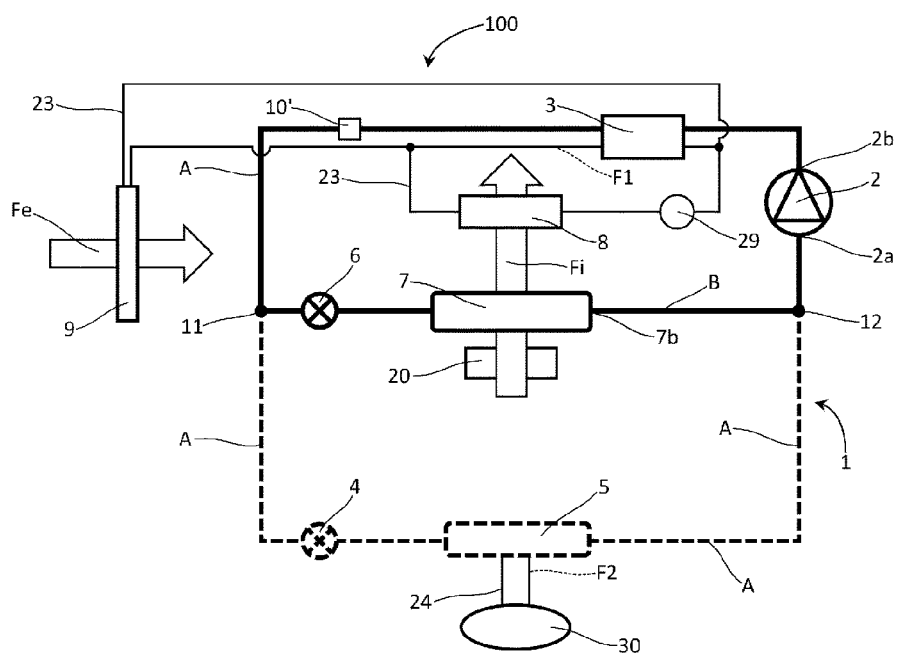
FIG. 8 is a schematic view of the thermal conditioning system of FIG. 1 operating in an operating mode referred to as passenger compartment air conditioning mode.

The minimum value Smin of the passage section S4 of the first expansion device 4 may be zero. In other words, the first expansion device 4 is then in the closed position, and the flow of refrigerant in the first evaporator 5 is zero. Cooling of the battery by the first evaporator 5 is then no longer active. Zero flow means zero except for leaks. The flow of refrigerant passing through the first evaporator 5 is thus negligible compared to the flow of refrigerant passing through the active heat exchangers of the thermal conditioning system 100. When the only active exchanger is the second exchanger 7, the system is in passenger compartment air conditioning mode and ensures cooling of the internal air stream Fi internal to the passenger compartment. The circulation of the refrigerant in this operating mode is shown in FIG. 8.

The thermal conditioning system 100 comprises a fourth heat exchanger 9 configured to exchange heat with an external air stream Fe, the thermal conditioning system being configured to circulate the first heat transfer fluid F1 in the fourth heat exchanger 9. The fourth heat exchanger makes it possible to cool the heat transfer fluid circulating in the first heat exchanger 3, by dissipating heat into the external air stream Fe. The passenger compartment air conditioning mode uses this operation. The heat extracted from the internal air stream Fi is released into the first exchanger 3, then into the external air stream Fe in the fourth heat exchanger 9. This fourth heat exchanger 9 is arranged for example in the front face of the vehicle, that is to say behind the vehicle grille. The external air stream Fe thus passes through the vehicle grille then exchanges heat with the fourth heat exchanger 9. The fourth exchanger 9 is connected to the circuit 23, at two connection points 41 and 42.

According to another exemplary embodiment of the method, the minimum value Smin of the passage section S4 of the first expansion device 4 is between 20% and 50% of a maximum passage section Smax of the first expansion device 4.

Figure 9:
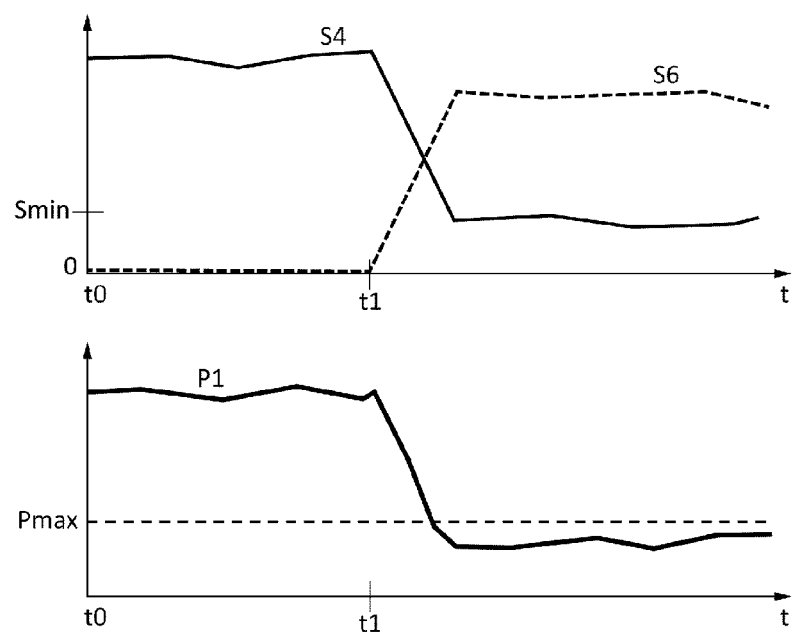
FIG. 9 shows the evolution over time of several parameters of the control method.

In this case, a flow of refrigerant circulates in the first evaporator 5 and a flow of refrigerant circulates simultaneously in the second heat exchanger 7. As before, the pressure of the flow of refrigerant which passes through the second heat exchanger 7 is lower than the saturation pressure Ps(Tint) of the refrigerant corresponding to the ambient temperature Tint. The liquid refrigerant accumulated in the second heat exchanger 7 may thus evaporate and join the quantity of refrigerant circulating in the refrigerant circuit 1. Cooling of the element 30 of the vehicle powertrain then remains active, with reduced thermal cooling power. Cooling of the air in the passenger compartment is ensured simultaneously. This scenario is illustrated in FIG. 9, which schematically depicts the evolution over time of the passage section S4 of the first expansion device 4, of the passage section S6 of the second expansion device 6, and of the pressure P1 of the refrigerant at the outlet of the first evaporator 5. At time t0, the pressure P1 is above the admissible maximum pressure threshold Pmax, such that migration of refrigerant toward the second exchanger 7 is possible. At time t1, step ii) of controlling the pressure P1 of the refrigerant at the outlet of the first evaporator 5 is applied. The passage section S4 of the first expansion device 4 is reduced, without being eliminated. The passage section S6 of the second expansion device 6 is increased. The pressure P1 decreases and falls below the predetermined pressure threshold Pmax.

Controlling the flow Q of high pressure refrigerant supplied by the compression device 2 is another way of ensuring control of the pressure P1 at the outlet of the first evaporator 5. According to another aspect of the method, in which the compression device 2 is of rotary type, the method comprises the step of:

d2) increasing a speed of rotation of the compression device 2 to a value above a predetermined speed threshold Nmin.

Increasing the speed of rotation of the compression device, making it possible to increase the flow of high pressure refrigerant discharged, is a way of bringing down the pressure of the refrigerant in the first evaporator 5.

To this end, the electric motor driving the moving parts of the compression device 2 is controlled by the electronic control unit in such a way as to obtain a set speed of rotation. The value of the set speed of rotation chosen in this case is greater than the predetermined speed threshold Nmin. This value of the speed of rotation makes it possible to obtain a flow of refrigerant high enough for the pressure in the first evaporator 5 to fall to a sufficiently low value. Thus, the low pressure refrigerant at the outlet of the first heat exchanger 5 cannot reach the second heat exchanger 7.

The compression device 2 has a maximum speed of rotation Nmax, and the predetermined speed threshold Nmin is greater than 80% of the maximum speed of rotation Nmax. The maximum speed of rotation Nmax is equal to 6000 rpm, for example. The predetermined speed making it possible to ensure that the pressure P1 of the refrigerant at the outlet of the first evaporator 5 is below the predetermined pressure threshold Pmax is for example 5000 rpm.

Controlling the passage section of the first expansion device 4, while leaving the thermal conditioning system 100 operating in the mode referred to as energy recovery mode, is another way of ensuring control of the pressure P1 at the outlet of the first evaporator 5. Thus, the method comprises the steps of:

d3) reducing the passage section of the first expansion device 4, e3) maintaining the passage section of the second expansion device 6 at a zero value.

Reducing the passage section of the first expansion device 4 is detrimental to heat exchange in the first evaporator 5. The temperature and therefore the pressure of the refrigerant falls so as to maintain the same level of heat exchange in the system. The step of reducing the passage section of the first expansion device is repeated until the pressure P1 of the refrigerant at the outlet of the first evaporator 5 is below the predetermined pressure threshold Pmax.

According to one embodiment of the method, step ii) is repeated continuously when the thermal conditioning system 100 is in operation.

This aspect of the control method is applied particularly when the refrigerant circuit does not include any device restricting the circulation of refrigerant from the second connection point 12 toward the outlet 7b of the second heat exchanger 7. This scenario corresponds to FIGS. 1 and 2.

In other words, the pressure P1 of the refrigerant at the outlet of the first evaporator 5 is maintained below the predetermined pressure threshold Pmax throughout the duration for which the thermal conditioning system 100 is in operation. In other words, control of the pressure P1 of the refrigerant at the outlet of the first evaporator 5 may be carried out permanently when the system is operating, so as to avoid a gradual accumulation of refrigerant in the second heat exchanger 7.

Figure 3:
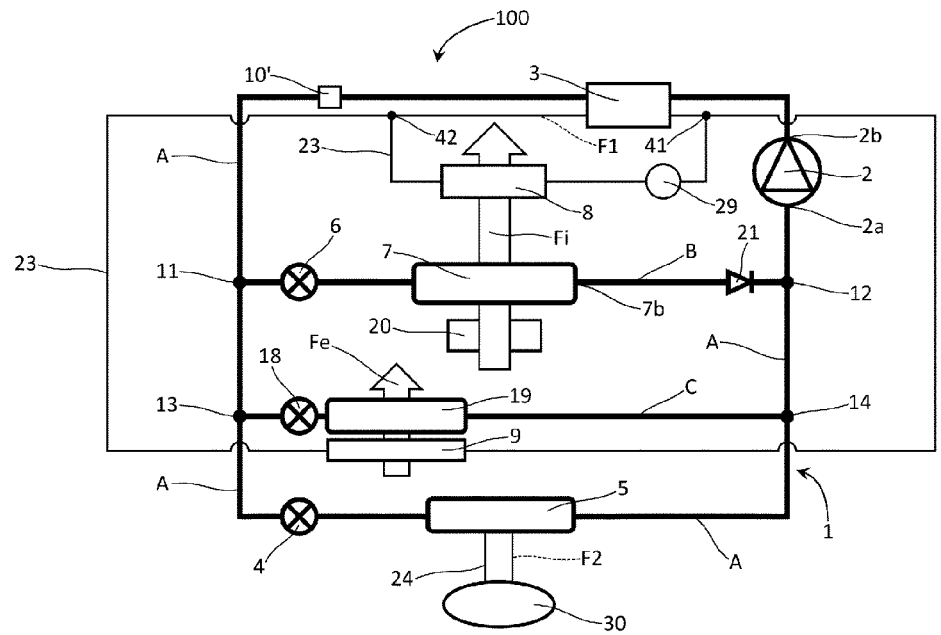
FIG. 3 is a schematic view of a thermal conditioning system according to a third embodiment of the invention.

According to another embodiment of the method, the refrigerant circuit 1 comprises a non-return valve 21 arranged on the first bypass branch B downstream of the second heat exchanger 7 and upstream of the second connection point 12, the non-return valve 21 being configured to block circulation of the refrigerant from the second connection point 12 toward an outlet 7b of the second heat exchanger 7. This configuration is shown in FIG. 3. The non-return valve 21 is a passive member, that is to say without electrical control.

According to a variant that has not been shown, the refrigerant circuit 1 comprises a shut-off valve arranged on the first bypass branch B downstream of the second heat exchanger 7 and upstream of the second connection point 12. The shut-off valve is controlled electrically by the electronic control unit. When the shut-off valve is in the closed position, circulation of the refrigerant from the second connection point 12 toward the outlet 7b of the second heat exchanger 7 is prevented.

The control method may comprise, before step ii), a step of:
i1) detecting an accumulation of refrigerant in the second heat exchanger 7, and step ii) is implemented only if an accumulation of refrigerant in the second heat exchanger 7 is detected in step i1).

In this embodiment, the non-return valve 21, or the shut-off valve if used instead of the non-return valve 21, makes it possible to limit the circulation of the refrigerant toward the second heat exchanger 7. This slows down the accumulation of liquid refrigerant compared to a system that does not comprise any device for restricting the circulation of refrigerant toward the outlet 7b of the second exchanger 7. It is thus possible to apply the step of controlling the pressure of the refrigerant at the outlet of the first evaporator 5 only when it is necessary. Temporary operation under conditions generating a pressure differential allowing migration and condensation of the refrigerant in the second exchanger 7 is acceptable, because the accumulation is then slow.

Detection of the accumulation of refrigerant in the second heat exchanger 7 occurs when the system has operated for a sufficient duration under conditions in which the pressure P1 of the refrigerant at the outlet of the first evaporator 5 was greater than the saturated vapor pressure corresponding to the temperature of the internal air stream Fi. The control step applied makes it possible to return the pressure P1 of the refrigerant at the outlet of the first evaporator 5 to a value below the saturated vapor pressure Ps corresponding to the temperature Tint of the internal air stream Fi, which makes it possible to evaporate the refrigerant that has previously become liquid in the second heat exchanger 7.

According to one aspect of the invention, step ii) is followed by a step of operation in a mode referred to as powertrain cooling mode in which the first heat transfer fluid F1 receives heat from the refrigerant and the second heat transfer fluid F2 transfers heat to the refrigerant, and in which a flow of refrigerant through the second heat exchanger 7 is zero. In other words, the evaporation of the refrigerant in the first evaporator 5 absorbs heat from the second heat transfer fluid F2 and cools the element 30 of the vehicle powertrain, which in this case is an electrical energy storage battery. The second exchanger 7 is itself not thermally active, since no flow of refrigerant is circulating therein.

Operation in powertrain cooling mode is reactivated when the accumulated refrigerant liquid has been vaporized by controlling the pressure in the first evaporator 5. Cooling of the element 30 of the powertrain of the vehicle is thus maximized.

In other words, when an accumulation of liquid refrigerant is detected, the thermal conditioning system 100 switches to an operating mode allowing the accumulated refrigerant to be vaporized, so that it begins to circulate and participate in heat exchange again. When this operating mode is no longer necessary, because all the accumulated liquid refrigerant has been vaporized, the thermal conditioning system 100 returns to the initial operating mode. The operation of the thermal conditioning system 100 comprises a succession of phases during which the refrigerant accumulates in liquid form, and phases during which evaporation of the accumulated liquid refrigerant is caused, by virtue of active control of the pressure value of the refrigerant in the first evaporator 5. The duration of operation in the phase allowing evaporation of the refrigerant in the second heat exchanger 7 is for example of the order of 1 minute for an ambient temperature of −5° C. This phase may be triggered after approximately 2 hours of operation in powertrain cooling mode, during which the pressure in the first evaporator 5 is above the saturation pressure Ps corresponding to the temperature of the air in the vicinity of the second exchanger 7.

Various means of detecting an excessive accumulation of liquid refrigerant in the second heat exchanger 7 will now be described.

According to one exemplary embodiment of the method, step i1) of detecting an accumulation of refrigerant in the second heat exchanger 7 comprises the sub-steps of:
determining a temperature of the second heat transfer fluid F2 at the outlet of the first evaporator 5,
if the temperature determined is above a first predetermined threshold Th1, detecting an accumulation of refrigerant in the second heat exchanger 7.

As a variant or additionally,
step i1) of detecting an accumulation of refrigerant in the second heat exchanger 7 comprises the sub-steps of:
determining a speed of variation of the temperature T2 of the second heat transfer fluid F2 at the outlet of the first evaporator 5,
if the speed of variation determined is above a second predetermined threshold Th2, detecting an accumulation of refrigerant in the second heat exchanger 7.

Too rapid an increase in the temperature of the second heat transfer fluid F2 is an indicator of a lack of refrigerant circulating in the circuit 1, in other words an excessive accumulation of liquid refrigerant. Monitoring the temperature of the second heat transfer fluid therefore makes it possible to detect the accumulation of refrigerant in the second heat exchanger 7.

According to one exemplary embodiment, the predetermined threshold Th2 depends on an electrical power of the element 30 of the transmission chain. The higher the electrical power, for example the electrical battery charging power, the higher the threshold Th2.

According to one embodiment, in which the thermal conditioning system comprises a refrigerant accumulation device 10' arranged on the main loop A downstream of the first exchanger 3 and upstream of the first connection point 11, the step of detecting an accumulation of refrigerant in the second heat exchanger 7 comprises the sub-steps of:
  determining a value of superheating sh of the refrigerant at the outlet of the first evaporator 5,
    if the superheating sh determined is above a third predetermined threshold Th3, detecting an accumulation of refrigerant in the second heat exchanger 7.

When the architecture of the conditioning device allows superheating of the refrigerant at the inlet of the compression device, excessive superheating indicates a lack of refrigerant circulating in the circuit. By definition, superheating sh is equal to the difference between the actual temperature of the refrigerant at the outlet of the first evaporator 5 and the condensation temperature of the refrigerant for the pressure prevailing in the first evaporator 5. This architecture is shown in particular in FIGS. 1 and 3.

According to another embodiment, in which the thermal conditioning system comprises a refrigerant accumulation device 10 arranged on the main loop A downstream of the second connection point 12 and upstream of the compression device 2,
the step of detecting an accumulation of refrigerant in the second heat exchanger 7 comprises the sub-steps of:
  determining a value of supercooling sc of the refrigerant at the inlet of the first expansion device 4,
    if the supercooling sc determined is below a fourth predetermined threshold Th4, detecting an accumulation of refrigerant in the second heat exchanger 7.

When the architecture of the conditioning device allows supercooling of the refrigerant at the outlet of the first heat exchanger, in other words at the inlet of the first expansion device, too low a supercooling value indicates a lack of refrigerant in the circuit. By definition, the supercooling sc value is equal to the difference between the actual temperature of the refrigerant at the inlet of the first expansion device 4 and the condensation temperature of the refrigerant for the pressure prevailing at the inlet of the first expansion device 4. This architecture is shown in FIG. 2.

Once an excessive accumulation of refrigerant in the second heat exchanger 7 is detected, step ii) of controlling the pressure at the outlet of the first evaporator 5 is activated in order to cause the evaporation of the accumulated refrigerant.

According to one embodiment of the method, step ii) of controlling the pressure P1 of the refrigerant at the outlet of the first evaporator 5 is applied for a predetermined duration Dapp.

According to one exemplary embodiment, the predetermined duration Dapp depends on the temperature of the internal air stream Fi.

According to another exemplary embodiment, the method comprises the steps of:
  a) determining a temperature Tint of the internal air stream Fi,
  b) determining a saturated vapor pressure Ps of the refrigerant for the determined value of the temperature Tint of the internal air stream Fi,
  c) determining the difference between the saturated vapor pressure Ps of the refrigerant for the determined value of the temperature Tint of the internal air stream Fi and the predetermined threshold Pmax,
and the predetermined duration Dapp depends on the difference determined in step c).

The duration of application of the pressure control phase, allowing evaporation of the refrigerant in the second heat exchanger 7, is for example of the order of 1 minute for a temperature of the internal air stream Fi of the order of −5° C.

Figure 4:
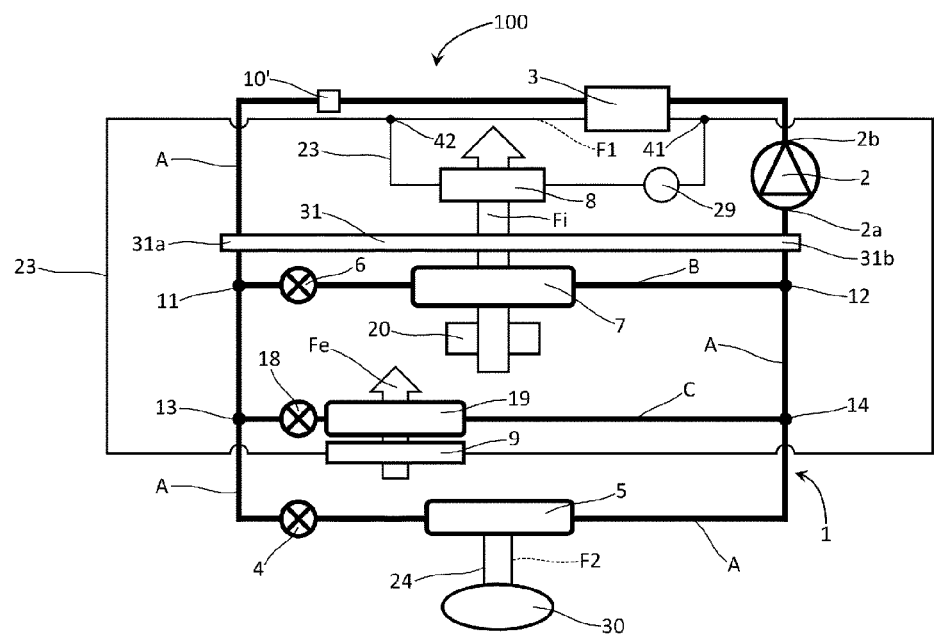
FIG. 4 is a schematic view of a variant of the thermal conditioning system of FIG. 3.

The method described may be applied to thermal conditioning system architectures comprising additional heat exchangers. FIG. 3 and FIG. 4 schematically depict such a configuration.

According to one embodiment, the thermal conditioning system comprises a second bypass branch C connecting a third connection point 13 positioned on the main loop A downstream of the first connection point 11 and upstream of the first expansion device 4 to a fourth connection point 14 positioned on the main loop A downstream of the first evaporator 5 and upstream of the second connection point 12, the second bypass branch C comprising a third expansion device 18 and a third heat exchanger 19 configured to exchange heat with an external air stream Fe external to a passenger compartment of the motor vehicle. The fourth heat exchanger 9 is arranged upstream, according to the direction of flow of the external air stream Fe, of the third heat exchanger 19.

The third heat exchanger 19 ensures operation in heat pump mode. In other words, the heat allowing the vaporization of the refrigerant in the third heat exchanger 19 is taken from the external air stream Fe, and is transferred to the internal air stream Fi internal to the passenger compartment. This transfer may be carried out directly, or indirectly via the first heat transfer fluid F1.

According to the embodiment of FIGS. 3 and 4, the thermal conditioning system 100 comprises an internal heat exchanger 31 arranged jointly on the main loop A downstream of the first heat exchanger 3 and upstream of the first connection point 11, and on the main loop A downstream of the second connection point 12 and upstream of the compression device 2. The internal heat exchanger 31 makes it possible to increase the variation in enthalpy of the refrigerant during the thermodynamic cycle and improves the efficiency of the system.

The internal heat exchanger 31 comprises a first heat exchange section 31a arranged on the main loop downstream of the first heat exchanger 3 and upstream of the first connection point 11. The internal heat exchanger 31 comprises a second heat exchange section 31b also arranged on the main loop A downstream of the second connection point 12 and upstream of the compression device 2. The internal heat exchanger 31 is configured to allow heat exchange between the refrigerant in the first heat exchange section 31a and the refrigerant in the second heat exchange section 31b.

According to another exemplary embodiment, the method comprises the steps of:
  Heating the internal air stream Fi so that the pressure P1 of the refrigerant at the outlet of the first evaporator 5 is below a predetermined threshold Pmax.

By heating the air surrounding the second heat exchanger 7, which is in this case the passenger compartment evaporator, this evaporator 7 ceases to be a cold spot in the refrigerant circuit, a cold spot at which the refrigerant is likely to accumulate in the liquid state. In other words, heating the air stream in the vicinity of the second exchanger 7 makes it possible to raise the value of the pressure corresponding to point A7b in FIG. 5, in such a way as to reduce and gradually eliminate the pressure differential between point A5 and point A7b. To be specific, the increase in the temperature of the internal air stream in the vicinity of the second exchanger 7 makes it possible to raise the value of the saturated vapor pressure in the second exchanger 7. The admissible maximum pressure threshold Pmax thus takes a higher value when the air surrounding the second heat exchanger 7 is heated than when the air surrounding the second heat exchanger 7 is not heated. The threshold Pmax may for example be taken equal to the condensation pressure of the refrigerant for the temperature corresponding to the temperature of the air surrounding the second heat exchanger 7.

According to one exemplary embodiment of the method, the thermal conditioning system 100 comprises an electric heating device 20, and heating of the internal air stream Fi is carried out by activation of an electric heating device 20.

The electric heating device 20 is for example a heating resistor. The electric heating device 20 is arranged in the vicinity of the second heat exchanger 7 so as to locally increase the temperature of the environment surrounding the second heat exchanger 7. In the figures, the electric heating device 20 is arranged upstream of the third heat exchanger 8. According to a variant that has not been shown, the electric heating device 20 may be arranged downstream of the third heat exchanger 8. It is not necessary to heat the entire passenger compartment of the vehicle. The flow rate of the internal air stream Fi is then zero or limited to a very low value, so as not to dissipate the heat from the heating device 20 throughout the passenger compartment of the vehicle.

The method thus comprises the step of:
Activating the electric heating device 20 for a predetermined duration.

As a variant or additionally, the method may comprise the steps of:
operating the thermal conditioning system in a mode referred to as energy recovery mode, in which the first heat transfer fluid F1 receives heat from the refrigerant and the second heat transfer fluid F2 transfers heat to the refrigerant, so as to heat the internal air stream Fi,
controlling the flow of the internal air stream Fi to a value below a predetermined threshold.

The first heat transfer fluid F1 heats the internal air stream Fi via the third heat exchanger 8. This step is applied before operating the thermal conditioning system in battery cooling mode. This step makes it possible to increase the temperature in the vicinity of the second exchanger 7 in order to prevent it from constituting a cold spot during the battery cooling phase. By using heat extracted from the battery 30 to heat the passenger compartment, the power supplied by the heating device 20 may be reduced, or in some cases completely dispensed with. This step also allows cooling of the battery before starting a charging phase, or from the start of a charging phase. This cooling allows the battery to be preconditioned before a rapid charging phase. To be specific, in the case of rapid charging at high electrical power, it can be difficult to keep the battery at its set temperature for the entire duration of charging, because the thermal power to be evacuated may be greater than the maximum power that the first evaporator 5 can dissipate. Ensuring cooling of the battery even before rapid charging begins allows better monitoring of the temperature setpoint at the end of charging.

According to one embodiment, the thermal conditioning system comprises a movable shutter 26 configured to adjust a rate of recirculation of the internal air stream Fi, and the method comprises the step of:
controlling the position of the movable shutter 26 so that the rate of recirculation of the internal air stream Fi is above a predetermined threshold Fmax.

The movable shutter 26 makes it possible to adjust the quantity of external air which may reach the passenger compartment of the vehicle. When the shutter 26 takes up a position blocking the entry into the passenger compartment of fresh air coming from outside the vehicle, the internal air stream Fi is composed of entirely recirculated air. Conversely, the movable shutter 26 may take up a position in which the external air stream entering the passenger compartment is at a maximum. The position of the shutter 26 is continuously adjustable between these two end positions.

By keeping the renewal of air in the passenger compartment at a low value, that is to say by minimizing the supply of fresh air, the energy necessary to maintain the temperature in the vicinity of the second heat exchanger 7 is reduced.

According to one variant embodiment, the predetermined threshold Fmax of the rate of recirculation of the internal air stream Fi is constant.

According to another variant embodiment, the method comprises the step of:
detecting the presence of at least one occupant in the passenger compartment of the vehicle,
if the presence of at least one occupant is detected, assigning a first value Fmax1 to the predetermined threshold Fmax of the rate of recirculation of the internal air stream Fi,
otherwise, assigning a second value Fmax2 to the predetermined threshold Fmax of the rate of recirculation of the internal air stream Fi, the second value Fmax2 being greater than the first value Fmax1.

The first value Fmax1 of the predetermined threshold Fmax of the rate of recirculation of the internal air stream Fi is between 10% and 60%. The second value Fmax2 of the predetermined threshold Fmax of the rate of recirculation of the internal air stream Fi is between 60% and 100%.

When the presence of at least one occupant is detected, it is necessary to ensure a minimum renewal of the air in the passenger compartment so that the air in the passenger compartment remains healthy. When, on the contrary, no occupant is detected in the vehicle, the need for air renewal is lower and the supply of external air may be very low, which helps to conserve heat in the passenger compartment. The energy to be supplied so that the temperature in the vicinity of the second heat exchanger 7 remains sufficient to prevent the migration of refrigerant may thus be reduced in the absence of occupants in the vehicle. This scenario corresponds to the situation where the occupants have left the vehicle while the vehicle battery is charging. The energy efficiency of the vehicle is thus improved.

The presence of at least one occupant in the vehicle is detected, for example, based on the response of pressure sensors placed in the seats of the vehicle.

The invention claimed is:

1. A method for controlling a thermal conditioning system,
the thermal conditioning system comprising a refrigerant circuit configured to circulate a refrigerant, the refrigerant circuit comprising:
a main loop comprising in succession in the direction of circulation of the refrigerant:
a compression device,
a first heat exchanger configured to exchange heat with a first heat transfer fluid,
a first expansion device,
a first evaporator configured to exchange heat with an element of a powertrain of a motor vehicle via a second heat transfer fluid, and
a first bypass branch connecting a first connection point positioned on the main loop downstream of the first heat exchanger and upstream of the first expansion device to a second connection point positioned on the main loop downstream of the first evaporator and upstream of the compression device, the first bypass branch comprising a second expansion device and a second heat exchanger configured to exchange heat with an internal air stream internal to a passenger compartment of the motor vehicle, wherein the thermal conditioning system is configured to operate in an operating mode referred to as powertrain cooling mode in which the first heat transfer fluid receives heat from the refrigerant and the second heat transfer fluid transfers heat to the refrigerant, and in which a flow of refrigerant through the second heat exchanger is zero, the method comprising:

determining a pressure of the refrigerant at the outlet of the first evaporator, controlling, depending on the determined pressure, at least one parameter among the following parameters:

passage section of the first expansion device, passage section of the second expansion device, flow of refrigerant supplied by the compression device, temperature of the internal air stream, so that the pressure of the refrigerant at the outlet of the first evaporator is below a predetermined pressure threshold.

2. The method as claimed in claim 1, further comprising:
determining a temperature of the internal air stream,
determining a saturated vapor pressure of the refrigerant corresponding to the temperature of the internal air stream,
assigning the saturated vapor pressure value determined to the predetermined pressure threshold.

3. The method as claimed in claim 1, further comprising:
reducing the passage section of the first expansion device to a minimum value,
increasing the passage section of the second expansion device so that a flow of refrigerant passes through the second heat exchanger.

4. The method as claimed in claim 1,
wherein controlling at least one of the parameters so that the pressure of the refrigerant at the outlet of the first evaporator is below a predetermined pressure, is repeated continuously when the thermal conditioning system is in operation.

5. The method as claimed in claim 1,
wherein the refrigerant circuit comprises a non-return valve arranged on the first bypass branch downstream of the second heat exchanger and upstream of the second connection point,
wherein the non-return valve is configured to block circulation of the refrigerant from the second connection point toward an outlet of the second heat exchanger.

6. The method as claimed in claim 1, the method further comprising, before controlling a parameter:
detecting an accumulation of refrigerant in the second heat exchanger, and
wherein controlling at least one of the parameters so that the pressure of the refrigerant at the outlet of the first evaporator is below a predetermined pressure, is implemented only if an accumulation of refrigerant in the second heat exchanger is detected.

7. The method as claimed in claim 6,
wherein the thermal conditioning system comprises a refrigerant accumulation device arranged on the main loop downstream of the first exchanger and upstream of the first connection point, and
wherein detecting an accumulation of refrigerant in the second heat exchanger comprises:
determining a value of superheating of the refrigerant at the outlet of the first evaporator,
if the superheating determined is above a third predetermined threshold, detecting an accumulation of refrigerant in the second heat exchanger.

8. The method as claimed in claim 6,
wherein the thermal conditioning system comprises a refrigerant accumulation device arranged on the main loop downstream of the second connection point and upstream of the compression device, and
wherein detecting an accumulation of refrigerant in the second heat exchanger comprises:
determining a value of supercooling of the refrigerant at the inlet of the first expansion device,
if the supercooling determined is below a fourth predetermined threshold, detecting an accumulation of refrigerant in the second heat exchanger.

9. The method as claimed in claim 1, further comprising:
heating the internal air stream so that the pressure of the refrigerant at the outlet of the first evaporator is below a predetermined threshold.

10. The method as claimed in claim 9,
wherein the thermal conditioning system comprises an electric heating device, and
wherein heating of the internal air stream is carried out by activation of an electric heating device.

11. The method as claimed in claim 9, further comprising:
operating the thermal conditioning system in a mode referred to as energy recovery mode, in which the first heat transfer fluid receives heat from the refrigerant and the second heat transfer fluid transfers heat to the refrigerant, so as to heat the internal air stream, and
controlling the flow of the internal air stream to a value below a predetermined threshold.

12. The method as claimed in claim 11,
wherein the thermal conditioning system comprises a movable shutter configured to adjust a rate of recirculation of the internal air stream,
wherein the method further comprises:
controlling the position of the movable shutter so that the rate of recirculation of the internal air stream is above a predetermined threshold.

13. The method as claimed in claim 12, further comprising:
detecting the presence of at least one occupant in the passenger compartment of the vehicle,
if the presence of at least one occupant is detected, assigning a first value to the predetermined threshold of the rate of recirculation of the internal air stream,
otherwise, assigning a second value to the predetermined threshold of the rate of recirculation of the internal air stream,
wherein the second value being is greater than the first value.

* * * * *